US008289211B1

United States Patent
Truong et al.

(10) Patent No.: US 8,289,211 B1
(45) Date of Patent: Oct. 16, 2012

(54) METHOD AND APPARATUS FOR RANGING

(75) Inventors: Paul Tuong Truong, San Jose, CA (US); Dennis Lee Wilson, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 330 days.

(21) Appl. No.: 12/662,396

(22) Filed: Apr. 14, 2010

(51) Int. Cl.
*G01S 3/02* (2006.01)

(52) U.S. Cl. .......................................... 342/458; 342/463

(58) Field of Classification Search .................. 342/451, 342/458, 463–465; 370/329, 337
See application file for complete search history.

(56) References Cited

U.S. PATENT DOCUMENTS

| | | | |
|---|---|---|---|
| 2003/0097621 A1* | 5/2003 | Xin ................................. | 714/701 |
| 2010/0321237 A1* | 12/2010 | Na et al. ......................... | 342/373 |
| 2011/0148701 A1* | 6/2011 | Cohen et al. .............. | 342/357.64 |
| 2012/0039272 A1* | 2/2012 | Lee et al. ....................... | 370/329 |
| 2012/0062426 A1* | 3/2012 | Tocker .......................... | 342/378 |

* cited by examiner

*Primary Examiner* — Dao Phan

(74) *Attorney, Agent, or Firm* — Oliff & Berridge, PLC

(57) ABSTRACT

Aspects of the disclosure provide a method for ranging. The method includes receiving by a ranging apparatus a first ranging signal transmitted from a first remote apparatus. The first ranging signal includes a first digital sequence that is a logic combination of a first group of co-prime component codes having co-prime cycle lengths. Further, the method includes detecting first component shifts of the first digital sequence corresponding to the first group of co-prime component codes, and determining a first ranging code shift of the first digital sequence based on the first component shifts.

21 Claims, 8 Drawing Sheets

METHOD AND APPARATUS FOR RANGING

BACKGROUND

Generally, pseudo-random-noise (PRN) codes are used for ranging. In an example, a ground station transmits a ranging signal to a satellite. The ranging signal includes a binary sequence formed from one or more PRN codes. When the satellite receives the ranging signal, the satellite suitably sends a return ranging signal with the binary sequence. When the ground station receives the return ranging signal, the ground station determines a shift of the received binary sequence with regard to a reference sequence in order to detect a traveling time of the ranging signals, and further, a distance between the ground station and the satellite, for example.

SUMMARY

Aspects of the disclosure can provide a method for ranging. The method includes receiving by a ranging apparatus a first ranging signal transmitted from a first remote apparatus. The first ranging signal includes a first digital sequence that is a logic combination of a first group of co-prime component codes having co-prime cycle lengths. Further, the method includes detecting first component shifts of the first digital sequence corresponding to the first group of co-prime component codes, and determining a first ranging code shift of the first digital sequence based on the first component shifts.

In an embodiment, the method includes transmitting by the ranging apparatus an initial ranging signal including the first digital sequence. The initial ranging signal is received by the first remote apparatus. The first remote apparatus transmits the first ranging signal in response to receiving the initial ranging signal. Then, the method includes determining by the ranging apparatus a distance between the ranging apparatus and the first remote apparatus based on the first ranging code shift and a transmission rate of the first digital sequence.

In another embodiment, the method includes receiving by the ranging apparatus at least a second ranging signal transmitted from a second remote apparatus. The second ranging signal includes a second digital sequence that is a logic combination of a second group of co-prime component codes having co-prime cycle lengths. Further, the method includes detecting second component shifts of the second digital sequence corresponding to the second group of co-prime component codes, and determining a relative ranging code shift between the first digital sequence and the second digital sequence based on the first component shifts and the second component shifts.

Further, in an embodiment, the method includes determining a position of the first ranging apparatus based on at least the relative ranging code shift.

To determine the relative ranging code shift, in an embodiment, the method includes determining the first ranging code shift of the first digital sequence based on the first component shifts, determining a second ranging code shift of the second digital sequence based on the second component shifts, and determining the relative ranging code shift based on the first ranging code shift and the second ranging code shift.

In another embodiment, when the first group of co-prime component codes and the second group of co-prime component codes are the same, the method includes determining relative component shifts between the first component shifts and the second component shifts, and determining the relative ranging code shift between the first digital sequence and the second digital sequence based on the relative component shifts.

According to an aspect of the disclosure, to detect the first component shifts of the first digital sequence corresponding to the first group of co-prime component codes, the method includes configuring a group of component code generators based on a shift configuration to generate the first group of co-prime component codes, combining the first group of co-prime component codes to generate a local digital sequence in association with the shift configuration, and calculating a correlation of the first digital sequence and the local digital sequence.

In an example, when a first one of the first group of co-prime component codes has a cycle length of n, the method includes respectively configuring a first component code generator for generating the first co-prime component code based on 0 to n−1 modulo shifts. Further, the method includes respectively calculating correlations in association with the modulo shifts, and determining one of the modulo shifts having a largest correlation as one of the first component shifts of the first digital sequence corresponding to the first co-prime component code.

Aspects of the disclosure can provide a ranging apparatus for use with one or more remote apparatuses. The ranging apparatus includes a receiver configured to receive a first ranging signal transmitted from a first remote apparatus. The first ranging signal includes a first digital sequence that is a logic combination of a first group of co-prime component codes having co-prime cycle lengths. The ranging apparatus further includes a range acquisition module configured to detect first component shifts of the first digital sequence corresponding to the first group of co-prime component codes, and determine a first ranging code shift of the first digital sequence based on the first component shifts.

In an embodiment, the ranging apparatus includes a ranging code generator configured to generate the first digital sequence, and a transmitter module configured to transmit an initial ranging signal including the first digital sequence. The initial ranging signal is received by the first remote apparatus. The first remote apparatus transmits the first ranging signal in response to receiving the initial ranging signal.

According to an aspect of the disclosure, the ranging code generator includes a plurality of component code generators configured to generate the first group of co-prime component codes, and a logic combiner configured to combine the first group of co-prime component codes to generate the first digital sequence. In an embodiment, the ranging apparatus includes an encryption module configured to encrypt the first digital sequence before transmission.

Further, in an embodiment, the range acquisition module is configured to determine a distance between the ranging apparatus and the first remote apparatus based on the first ranging code shift and a transmission rate of the first digital sequence.

In an embodiment, the ranging apparatus receives multiple ranging signals from multiple remote apparatuses and determines a position of the ranging apparatus based on the multiple ranging signals. Specifically, the receiver is configured to receive a second ranging signal transmitted from a second remote apparatus. The second ranging signal includes a second digital sequence that is a logic combination of a second group of co-prime component codes. Then, the range acquisition module is configured to detect second component shifts of the second digital sequence corresponding to the second group of co-prime component codes, and detect a relative ranging code shift between the first digital sequence and the second digital sequence based on the first component shifts and the second component shifts.

In an example, when the first group of co-prime component codes and the second group of co-prime component codes are the same, the range acquisition module is configured to detect relative component shifts between the first component shifts and the second component shifts, and determine the relative ranging code shift based on the relative component shifts.

According to an aspect of the disclosure, the range acquisition module further includes a plurality of shiftable component code generators configured to generate the first co-prime component codes based on a shift configuration, a logic combiner configured to combine the generated first co-prime component codes into a local digital sequence in association with the shift configuration, and a correlator configured to calculate a correlation between the local digital sequence and the received first digital sequence. The correlation is in association with the shift configuration.

Further, in an embodiment, the range acquisition module includes a ranging controller to control the plurality of shiftable component code generators, the logic combiner and the correlator. In an example, the ranging controller is configured to respectively configure a first one of the shiftable component code generators for generating a first co-prime component code of the first group of co-prime component codes based on 0 to n−1 modulo shifts when the first co-prime component code has a cycle length of n. Further, the ranging controller receives correlations in association with the modulo shifts, and determines one of the modulo shifts having a largest correlation as one of the component shifts of the first digital sequence corresponding to the first co-prime component code.

It is noted that the ranging apparatus can also include a decryption module configured to decrypt the first digital sequence from an encrypted sequence extracted from the first ranging signal.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1A:
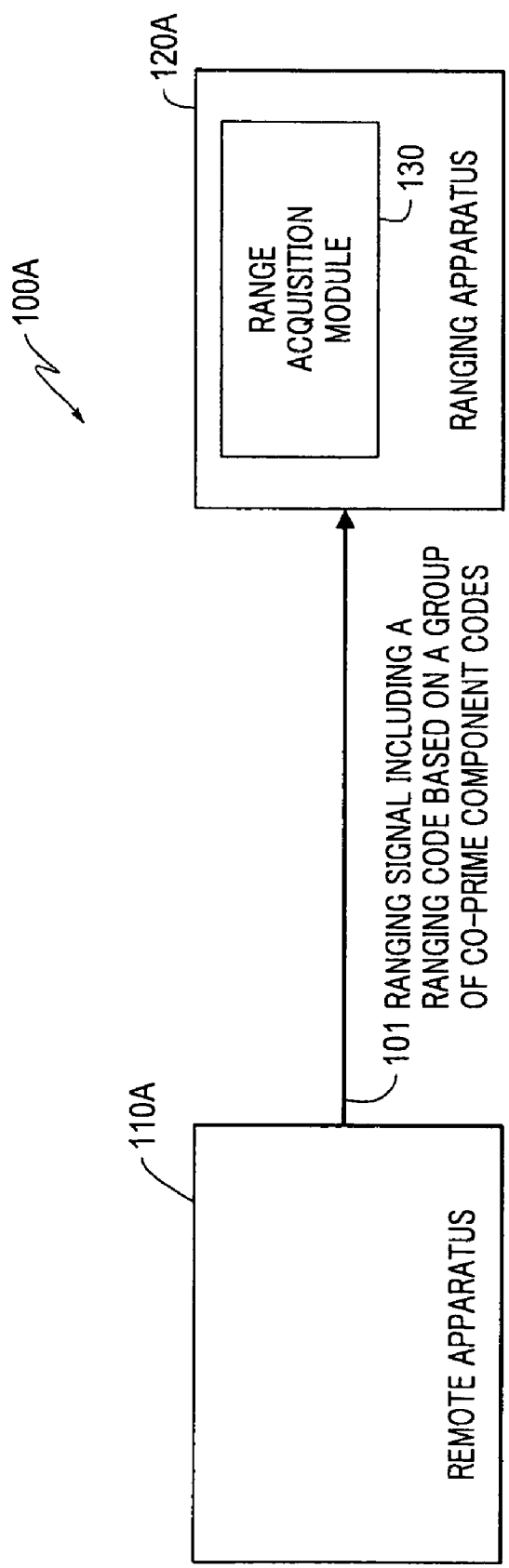
FIGS. 1A-1C show block diagrams of ranging system examples according to the disclosure.

FIG. 1A shows a block diagram of a ranging system example 100A according to an embodiment of the disclosure. The ranging system 100A includes a remote apparatus 110A and a ranging apparatus 120A. The remote apparatus 110A transmits a ranging signal 101 to the ranging apparatus 120A. The ranging signal 101 includes a ranging code that can be compared with a reference to detect a ranging code shift. The ranging code is formed based on a group of co-prime component codes. Thus, the ranging code shift can be determined relatively fast based on respective shifts of the group of co-prime component codes.

The ranging apparatus 120A can be any suitable electrical apparatus, such as a cell phone, a handheld device, a mobile computing device, a desktop computer, a printing device, a global positioning system (GPS), and the like, that receives the ranging signal 101, processes the ranging signal 101, and detects range information from the ranging signal 101.

The remote apparatus 110A can be any suitable electrical apparatus that can transmit the ranging signal 101. In an embodiment, the remote apparatus 110A generates the ranging code, and transmits the ranging signal 101 to carry the ranging code. In another embodiment, the remote apparatus 110A receives the ranging code from another device, such as the ranging apparatus 120A, and the like, and transmits the ranging signal 101 carrying the ranging code.

The ranging apparatus 120A and the remote apparatus 110A are coupled by any suitable link, such as a wireless link, a wired link, a combination of wireless links and wired links, and the like, that transmits the ranging signal 101.

The ranging apparatus 120A further includes a range acquisition module 130. The range acquisition module 130 determines shifts of the group of co-prime component codes. Based on the shifts of the group of co-prime component codes, the range acquisition module 130 determines a total ranging code shift of the ranging code. The ranging code shift can be further used to determine, for example, a traveling time of the ranging signal 101, a distance between the ranging apparatus 120A and the remote apparatus 110A, geographic position information of the ranging apparatus 120A, and the like.

In an embodiment, the ranging signal 101 includes a first ranging code and a second ranging code transmitted simultaneously. The first ranging code and the second ranging code are transmitted using different transmission rates. In an example, the first ranging code has a relatively short cycle length, and is transmitted at a relatively lower rate; the second ranging code has a relatively long cycle length, and is transmitted at a relatively higher rate.

When the ranging apparatus 120A receives the ranging signal 101, the ranging apparatus 120A determines a signal quality of the ranging signal 101. Based on the signal quality, the range acquisition module 130 uses the first ranging code and/or the second ranging code to obtain range information. For example, when a signal-to-noise ratio of the ranging signal 101 is relatively high, the range acquisition module 130 uses the first ranging code to acquire the range information within a relatively short time. However, when the signal-to-noise ratio of the ranging signal 101 is relatively low, the range information obtained from the first ranging code can have a relatively high error rate. Thus, the range acquisition module 130 uses the second ranging code to acquire the range information.

In another embodiment, the ranging code is encrypted to prevent spoofing. For example, the ranging code is encrypted and decrypted based on a pair of private key and public key. Specifically, the ranging code is encrypted with the public key of the pair. When the ranging apparatus 120A receives the ranging code, the ranging apparatus 120A decrypts the ranging code with the private key of the pair. Without the private key, unauthorized apparatus (not shown) cannot decrypt the ranging code.

Figure 1B:
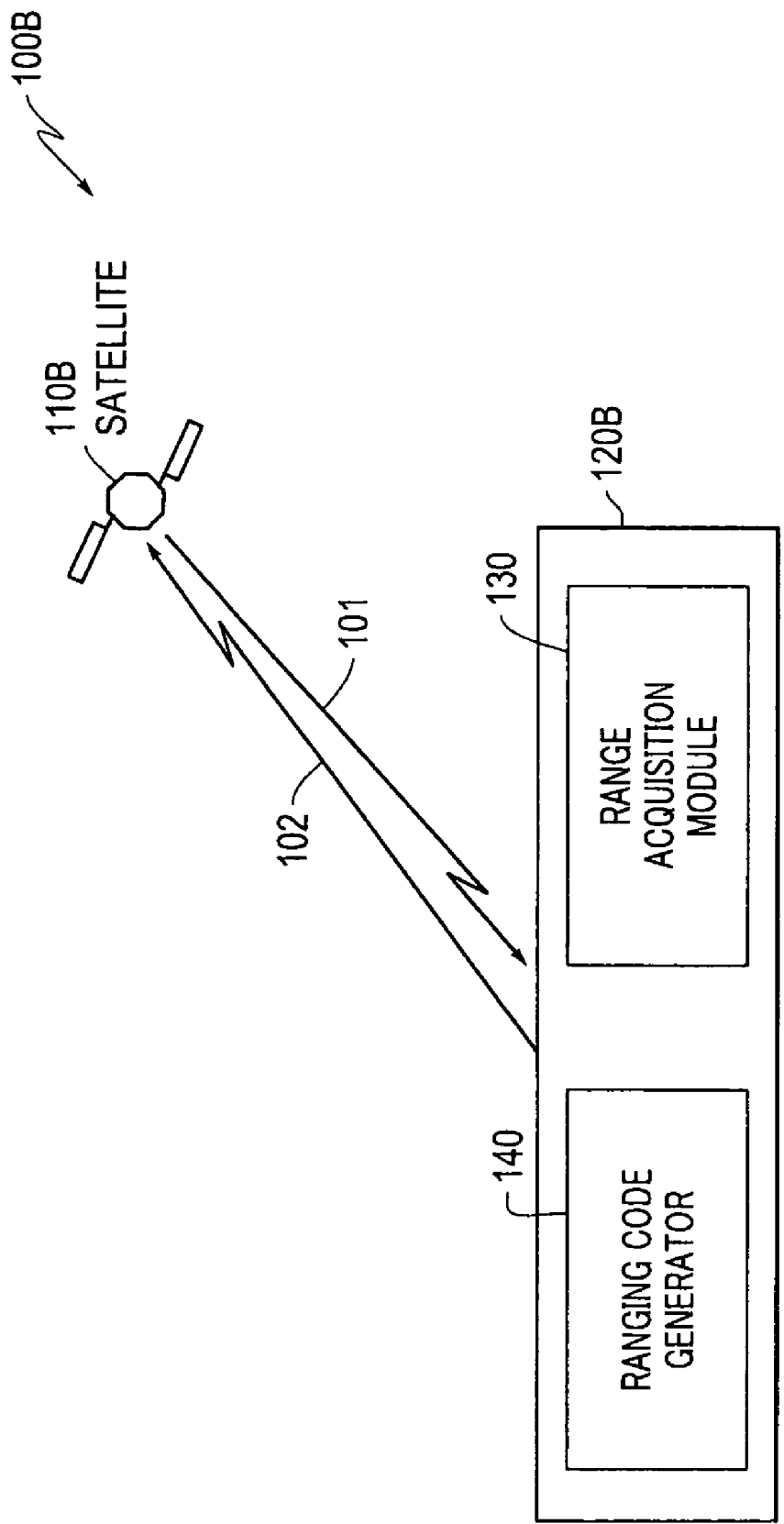

FIG. 1B shows a block diagram of a more detailed ranging system example 100B according to an embodiment of the disclosure. The ranging system 100B includes a ground station 120B and a satellite 110B. The ground station 120B transmits an initial ranging signal 102 carrying a ranging code. The satellite 110B receives the initial ranging signal 102, and transmits a return ranging signal 101 carrying the received ranging code. The ground station 120B receives the return ranging signal 101, and detects a ranging code shift with reference to a local digital sequence. Based on the ranging code shift, the ground station 120B further determines a traveling time of the ranging code, and a distance between the ground station 120B and the satellite 110B, for example.

In an embodiment, the ground station 120B includes a range acquisition module 130 and a ranging code generator 140. The ranging code generator 140 forms the ranging code based on a group of co-prime component codes. Further, the ground station 120B includes any suitable transmitter module (not shown) to transmit the initial ranging signal 102 that carries the ranging code. The initial ranging signal 102 is received by the satellite 110B. The satellite 110B suitably transmits the return ranging signal 101 in response to the received initial ranging signal 102. In an example, the satellite 110B translates a carrier frequency for carrying the ranging code.

When the ground station 120B receives the return ranging signal 101, the range acquisition module 130 determines respective shifts of the group of co-prime component codes, and then determines a ranging code shift based on the shifts of the group of co-prime component codes. Based on the ranging code shift, the ground station 120B can further determine a traveling time of the ranging code, a distance between the ground station 120B and the satellite 110B, and the like.

In an embodiment, the ranging code generator 140 includes a group of co-prime component code generators (not shown). The group of co-prime component code generators generates component codes having co-prime cycle lengths. In an example, each of the co-prime component code generators is a prime-code generator that generates a component code having a cycle length of a prime number, such as 11, 13, 17, and the like. Thus, the generated component codes have co-prime cycle lengths. In another example, a co-prime component code generator is configured to generate a component code having a cycle length of a non-prime number. However, the non-prime cycle length is relative prime with other cycle lengths of the generated component codes.

Further, the ranging code generator 140 includes a combiner (not shown) that combines the generated component codes into a combined ranging code having a longer cycle length. For example, when six component codes having cycle lengths 11, 13, 17, 19, 23 and 29 are selected, the cycle length of the combined ranging code is 30,808,063, which is a product of 11, 13, 17, 19, 23 and 29.

In an embodiment, the group of co-prime component code generators is suitably configured, such that the combined ranging code has a cycle length that is longer than a threshold. For example, a cycle time for transmitting a whole cycle length of the combined ranging code is longer than a signal traveling time from the ground station 120B to the satellite 110B and back to the ground station 120B.

In an embodiment, while keeping the cycle lengths of the component codes co-prime, the component codes are suitably selected to be pseudo-random noise (PRN) codes, such that the combined ranging code is a pseudo-random noise code. According to an embodiment of the disclosure, the combined ranging code can be configured to have desired correlation properties. Specifically, the combined ranging code has nearly no cross correlation with a different combined ranging code, which is formed based on different component codes or different logic. Further, the combined ranging code has nearly no correlation with itself, except for zero lag (zero shift). In an embodiment, correlation is calculated based on a correlation length. The correlation length is equivalent to the cycle length of the longest component code. Further, the shift of the combined ranging code is determined based on the shorter component codes. Because the combined ranging code is a combination of co-prime PN codes, thus when the combined ranging code is correlated with the received ranging code, all the component codes are aligned, and the component shifts can be identified.

In addition, the combined ranging code can have a relatively low frequency spectral density, for example, lower than the thermal noise. Thus, the combined ranging code is anti-jam, such that jamming signals have a relatively lower possibility to cause errors.

In an embodiment, the ranging code generator 140 is configurable. In an example, the ranging code generator 140 periodically selects a different group of co-prime component codes, and forms a different ranging code based on the selected group of co-prime component codes. In another example, the combined ranging code is a very long code, and the ranging code generator 140 periodically selects a portion of the combined ranging code. For example, it may take ten weeks to transmit the whole combined ranging code. The ranging code generator 140 selects a first week portion of the combined ranging code for a first week, and selects a same or a different week portion of the combined ranging code for a second week.

In addition, multiple ranging systems can share the same frequency domain for ranging code transmission. In an example, another ranging system can select a different group of co-prime component codes to form a different ranging code. The other ranging system can occupy the same frequency domain (e.g., having same carrier frequencies) as the ranging system 100B. In another example, when the combined ranging code is very long, such as 10 weeks long (it takes 10 weeks to transmit the whole combined ranging code), another ranging system selects a different week portion of the combined ranging code for ranging. The other ranging system can occupy the same frequency domain as the ranging system 100B.

Figure 1C:
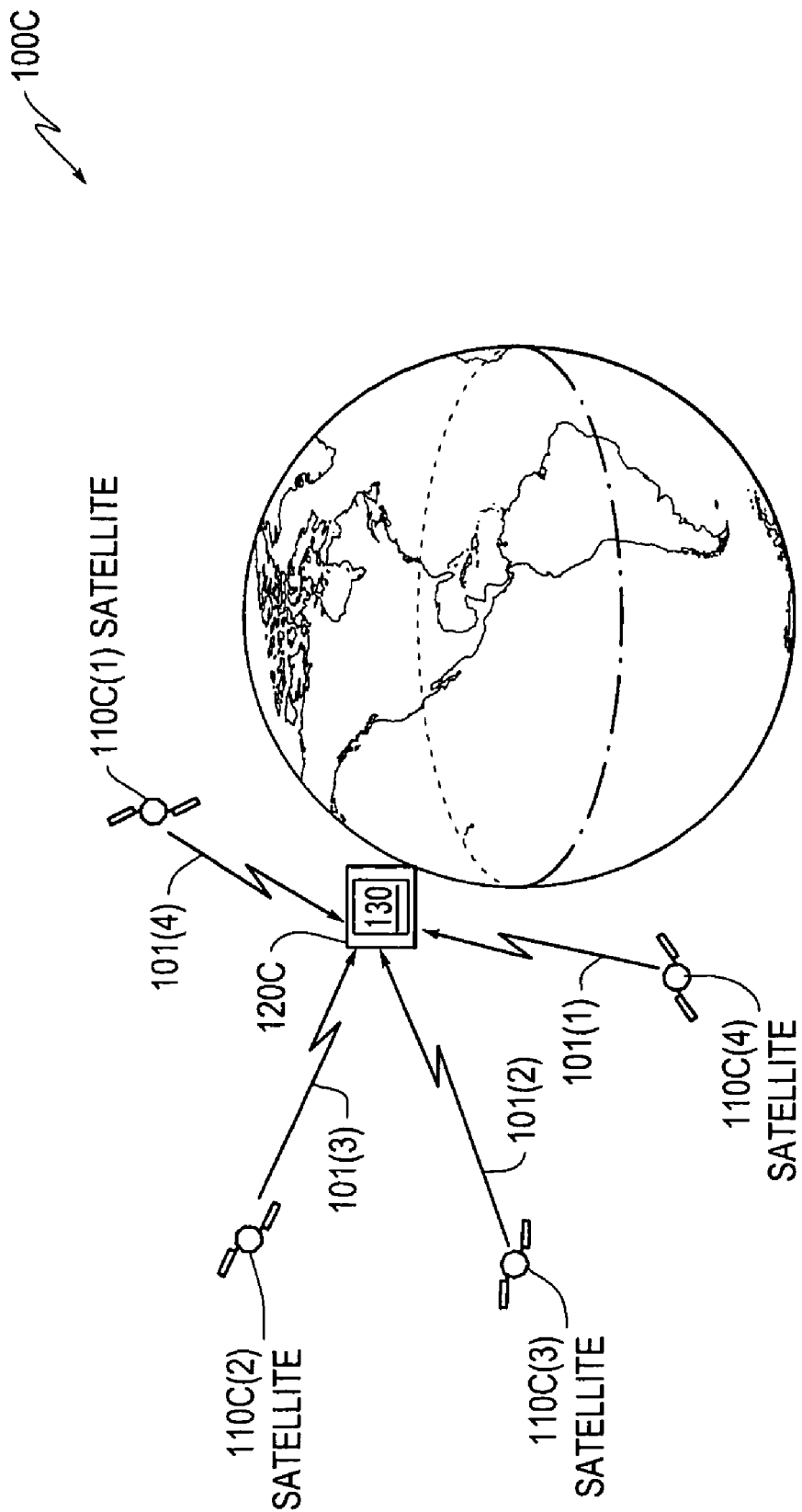

FIG. 1C shows a block diagram of another ranging system example 100C according to an embodiment of the disclosure. The ranging system 100C includes a ranging apparatus 120C at a geographic position on the Earth, and multiple satellites 110C(1-4). Each satellite 110C transmits a ranging signal 101 carrying a ranging code designated for the satellite 110C. The ranging code is formed based on a group of co-prime component codes. The ranging apparatus 120C receives multiple ranging signals 101(1-4) from the multiple satellites 110C(1-4). Based on the ranging signals 101(1-4), the ranging apparatus 120C determines the geographic position of the ranging apparatus 120C.

In an embodiment, different satellites 110C form their designated ranging codes based on different groups of co-prime component codes. In another embodiment, different satellites 110C uses different portions of a ranging code formed based on a same group of co-prime component codes.

In an embodiment, each satellite 110C includes a ranging code generator (not shown). The ranging code generator is suitably configured to generate the designated ranging code for the corresponding satellite 110C. Then, the satellite 110C transmits the ranging signal 101 carrying the designated ranging code. It is noted that the multiple satellites 110C(1-4) also transmit other suitable signals, such as signals carrying identifications, and the like, to assist the geographic positioning.

The ranging apparatus 120C includes a range acquisition module 130. In an embodiment, the range acquisition module 130 is configured to determine respective shifts of the group of co-prime component codes that forms each ranging code. Further, based on the shifts of the group of co-prime component codes, the range acquisition module 130 determines a ranging code shift for the ranging code. Based on the ranging code shifts of the received multiple ranging codes, the ranging apparatus 120C determines distances to the multiple satellites 110C(1-4), and further determines the geographic position of the ranging apparatus 120C, for example.

In another embodiment, the range acquisition module 130 is suitably configured to determine relative ranging code shifts of the received multiple ranging codes. Further, based on the relative ranging code shifts, the range acquisition module 130 determines relative delays of the multiple ranging signals 101(1-4), and further determines the geographic position of the ranging apparatus 120C, for example. In an example, the multiple ranging signals 101(1-4) use different portions, such as a first week portion, a second week portion, and the like, of a relatively long ranging code formed based on a same group of co-prime component codes. Thus, a relative ranging code shift of two received ranging codes can be determined based on relative component shifts corresponding to the group of co-prime component codes. In an example, the relative component shifts are calculated by adding or subtracting the corresponding component shifts of the two received ranging codes. Further, the relative ranging code shift is calculated based on the relative component shifts, for example, using Chinese reminder theorem.

Figure 2:
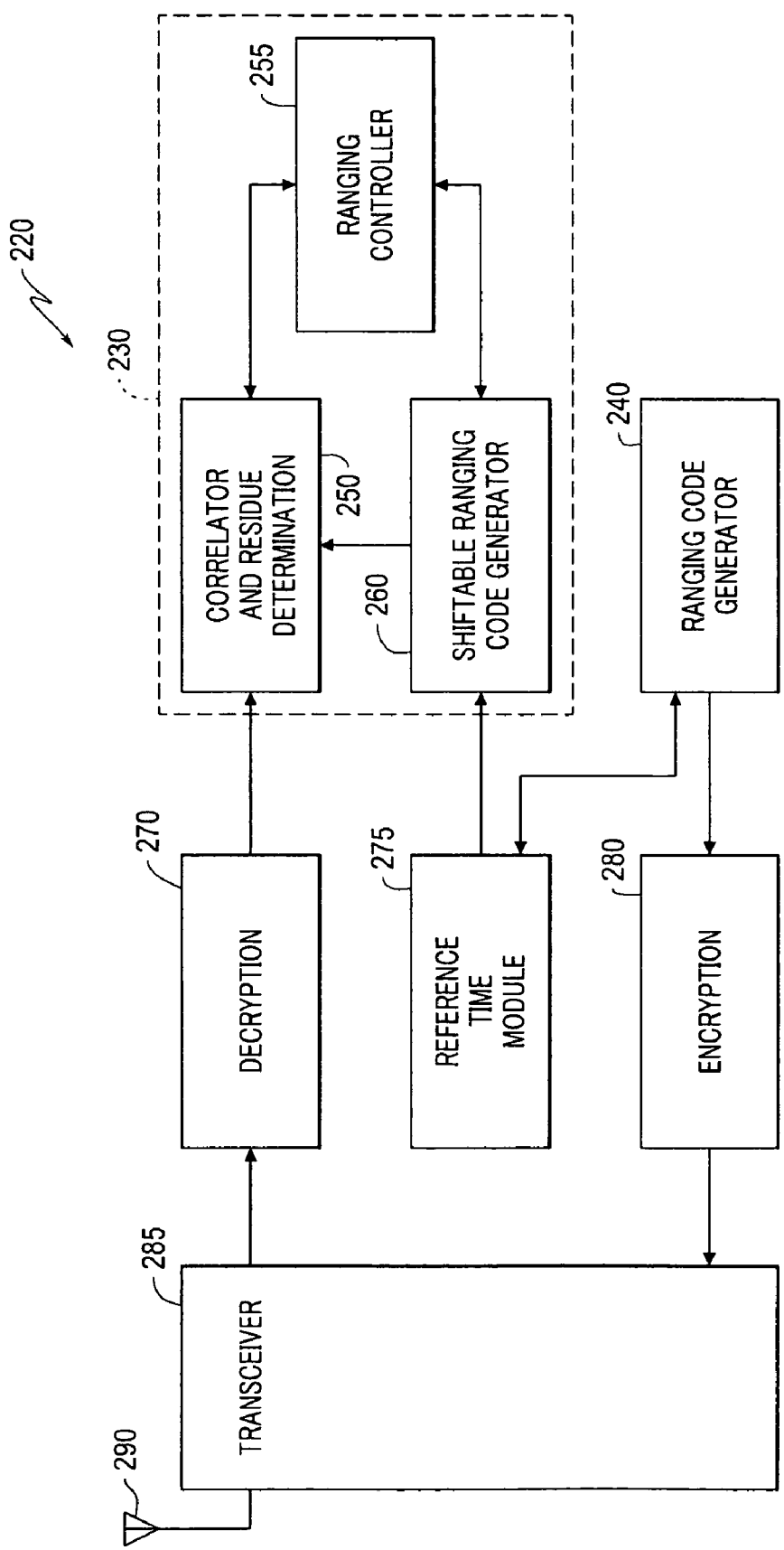
FIG. 2 shows a block diagram of a ranging apparatus example according to an embodiment of the disclosure.

FIG. 2 shows a block diagram of a ranging apparatus example 220 according to an embodiment of the disclosure. The ranging apparatus 220 includes an antenna module 290, a transceiver module 285, a decryption module 270, a range acquisition module 230 and a reference time module 275. These elements are coupled together as shown in FIG. 2.

The antenna module 290 is suitably configured to generate an electrical signal in response to, for example, electromagnetic waves in the air. The electrical signal is further processed by a receiving portion of the transceiver module 285. In addition, the antenna module 290 can be coupled to a transmitting portion of the transceiver module 285, and transmits electromagnetic waves in the air according to an electrical signal provided by the transmitting portion.

The receiving portion of the transceiver module 285 includes suitable modules to process the received electrical signal; and obtain a digital signal from the electrical signal. In an example, the receiving portion includes various analog circuits, such as amplifier, filter, and down-converter, to process the electrical signal using analog processing techniques. In addition, the receiving portion includes an analog-to-digital converter (ADC) that converts the processed analog signal to a digital signal. From the digital signal, a digital sequence, such as a binary sequence, can be obtained. The digital sequence includes one or more ranging codes. In an embodiment, the digital sequence includes a short ranging code and a long ranging code. In another embodiment, the ranging code is encrypted.

The decryption module 270 is configured to decrypt the ranging code when the ranging code is encrypted. In an embodiment, the ranging code is encrypted and decrypted based on a pair of public key and private key. In an example, the ranging code is encrypted using a public key before transmission. When the encrypted ranging code is received, the ranging code is decrypted using a private key in association with the public key.

The range acquisition module 230 is configured to determine shifts of co-prime component codes that form the ranging code. Based on the shifts of the co-prime component codes, the range acquisition module 230 determines a ranging code shift of the ranging code.

In an embodiment, the range acquisition module 230 includes a correlator 250, a shiftable ranging code generator 260, and a ranging controller 255. The shiftable ranging code generator 260 generates a local digital sequence based on a shift configuration. The local digital sequence is provided to the correlator 250. The correlator 250 calculates a correlation between the received digital sequence and the local digital sequence. The ranging controller 255 can change the shift configuration of the shiftable ranging code generator 260, and associate the shift configurations with correlations calculated by the correlator 250. Further, based on the shift configurations and the associated correlations, the ranging controller 255 determines component shifts, such as modulo reminders, for the co-prime component codes, and further determines the ranging code shift of the ranging code.

During operation, for example, the ranging apparatus 220 determines an identification of a ranging code for obtaining range information. In an example, the ranging apparatus 220 receives a signal including the identification. In another example, the ranging apparatus 220 determines the identification of the ranging code based on a standard, for example. Based on the identification of the ranging code, the ranging apparatus 220 suitably configures the shiftable ranging code generator 260 to generate a local digital sequence.

In an example, the ranging apparatus 220 configures the group of shiftable component code generators in accordance with the identified ranging code. The group of shiftable component code generators generates a group of component codes that form the identified ranging code. In addition, the ranging apparatus 220 configures a logic combiner for combining the group of component codes.

Further, the range acquisition module 230 calculates correlations corresponding to, for example, modulo shifts of each component code. For example, when the cycle length of a component code generator is 11, the range acquisition module 230 respectively shifts the component code generator according to 0, 1, 2, . . . and 10. The range acquisition module 230 configures the component code generator according to a modulo shift, keeps the shifts of the other component code generators, and generates a local digital sequence corresponding to the modulo shift. Then, the range acquisition module 230 calculates a correlation of the generated local digital sequence and the received digital sequence for a time duration. The correlation is in association with the modulo shift. Then, the range acquisition module 230 configures the component code generator according to a next modulo shift.

Based on correlations in association with module shifts, the range acquisition module 230 determines a modulo reminder (or a component shift that is congruent with the modulo reminder with regard to the cycle length of the component code) of the ranging code shift corresponding to the component code. For example, the range acquisition module 230 selects the modulo shift with the largest correlation as the modulo reminder for the component code.

Based on the modulo reminders (or the component shifts) for all the component codes, the range acquisition module 230 determines a ranging code shift. According to an embodiment of the disclosure, a mapping of the modulo reminders to the ranging code shift is one-on-one when the cycle lengths of the component codes are co-prime. The range acquisition module 230 can use any technique to determine the ranging code shift, such as extended Euclidean algorithm, and the like.

In an embodiment, for each modulo shift corresponding to a component code, the range acquisition module 230 consumes a time duration. To determine a modulo reminder for a component code, the range acquisition module 230 consumes a number of time durations with the number being equivalent to the cycle length of the component code. Further, to determine the modulo reminders for all the component codes, the range acquisition module 230 consumes a total number of time durations with the total number being equivalent to a sum of cycle lengths of the component codes.

In an example to determine a ranging code shift by shifting the ranging code, a total number of time durations with the total number being equivalent to a cycle length of the ranging code, are needed. Thus, when the cycle length of the ranging code is equivalent to a product of the cycle lengths of the component codes, the total number of time durations needed is in the order of a product of the cycle lengths of the component codes.

Additionally, in an embodiment, the ranging apparatus 220 can include a mechanism to generate and transmit a ranging code. In the FIG. 2 example, the ranging apparatus 220 includes a ranging code generator 240 and an encryption module 280 coupled with other elements as shown in FIG. 2. The ranging code generator 240 is configured to generate a ranging code based on a group of co-prime component codes. In an embodiment, the ranging code generator 240 includes a group of co-prime component code generators (not shown). The group of co-prime component code generators generates component codes having co-prime cycle lengths. Further, the ranging code generator 240 includes a combiner (not shown) that combines the generated component codes into a ranging code having a longer cycle length.

The encryption module 280 is configured to encrypt the ranging code. In an embodiment, the encryption module 280 encrypts the ranging code uses a public key of a target ranging apparatus. In an example, when the ranging code is used by the ranging apparatus 220 to obtain range information, the encryption module 280 encrypts the ranging code using a public key of the ranging apparatus 220. When the ranging code is used by another ranging apparatus (not shown) to obtain range information, the encryption module 280 encrypts the ranging code using a public key of the other ranging apparatus.

The reference time module 275 is configured to obtain timing information, and suitably distribute timing information in the ranging apparatus 220. In an example, the reference time module 275 obtains a GPS system time, and a reference clock from any suitable source, such as from a received signal, from a coupled apparatus, and the like. Further, the reference time module 275 provides the obtained timing information to the ranging code generator 240 and the range acquisition module 230 for various purposes, such as synchronization, update control, and the like.

Figure 3:
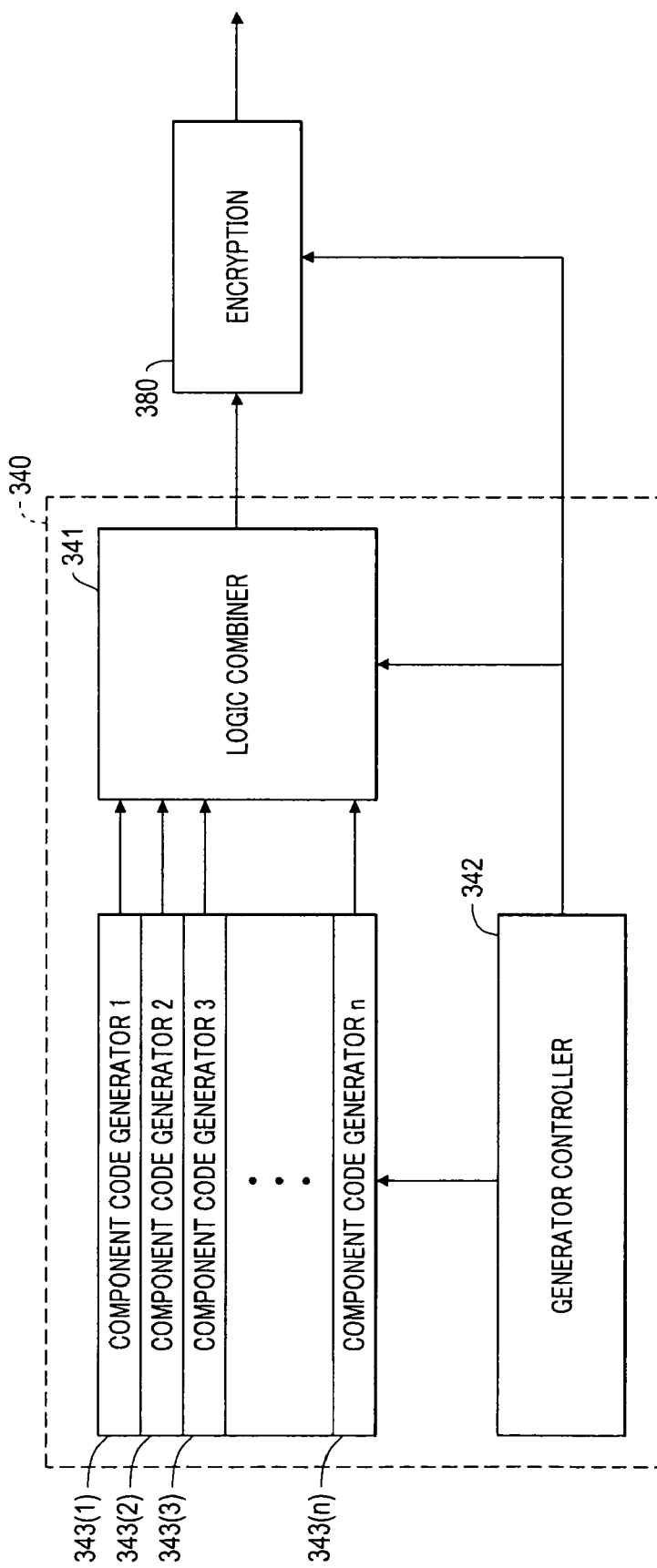
FIG. 3 shows a block diagram of a ranging code generator example according to an embodiment of the disclosure.

FIG. 3 shows a block diagram of a ranging code generator example 340 coupled with an encryption module 380 according to an embodiment of the disclosure. The ranging code generator 340 includes a plurality of component code generators 343(1-$n$), a logic combiner 341, and a generator controller 342. These elements are coupled together as shown in FIG. 3.

According to an embodiment of the disclosure, the component code generators 343(1-$n$) generate a group of component codes having co-prime cycle lengths. In an embodiment, the cycle lengths of the group of component codes are prime numbers, and thus they are pair-wise co-prime. In another embodiment, a cycle length can be a non-prime number. However, the cycle length is co-prime with other cycle lengths. According to another aspect of the disclosure, the generated component codes are PRN codes.

The logic combiner 341 is configured to combine the component codes, and generates a combined ranging code. Because the cycle lengths of the component codes are co-prime, the cycle length of the combined ranging code is a product of the cycle lengths of the component codes.

The logic combiner 341 can use any suitable logic to generate the combined ranging code. In an embodiment, each bit of the combined ranging code is a logic combination of corresponding bits of the group of the component codes. In an example, each bit of the combined ranging code is generated based on Eq. 1:

$$r = x \oplus (a \times b + a \times c + b \times c) \qquad \text{Eq. 1}$$

where r denotes a bit of the ranging code, x denotes a corresponding bit of a first component code, a denotes a corresponding bit of a second component code, b denotes a corresponding bit of a third component code, c denotes a corresponding bit of a third component code, × denotes a logic AND operation, + denotes a logic OR operation, and ⊕ denotes a logic XOR operation. In addition, in an example, the logic combination includes a clock signal, such as Eq. 2:

$$r = x \oplus (a \times b + a \times c + b \times c) + \text{clock} \qquad \text{Eq. 2}$$

The generator controller 342 provides various control signals to the component code generators 343 (1-$n$) to control their operations. For example, the generator controller 342 provides a high frequency clock signal to synchronize the component code generators 343(1-$n$) to generate bits of the component codes in parallel. In another example, the generator controller 342 provides a reset signal to the component code generators 343(1-$n$) to periodically, such as weekly, restart the generation of the ranging code. In another embodiment, the component code generators 343(1-$n$) and the logic combiner 341 are configurable. The generator controller 342 can send signals to reconfigure the component code generators 343(1-$n$) and the logic combiner 341 to generate a different ranging code.

It is noted that the ranging code generator 340 can be implemented by software, hardware, or a combination of software and hardware. In an example, the ranging code generator 340 is implemented as firmware that can be executed by a processor to perform the ranging code generation. In another example, the ranging code generator 340 is implemented in a field programmable gate array (FPGA). In another example, the ranging code generator 340 is implemented as software instructions that can be stored on a computer readable storage medium. The software instructions can be executed by a processor to perform the ranging code generation. In another example, the ranging code generator 340 is implemented as an application specific integrated circuit (ASIC).

Figure 4:
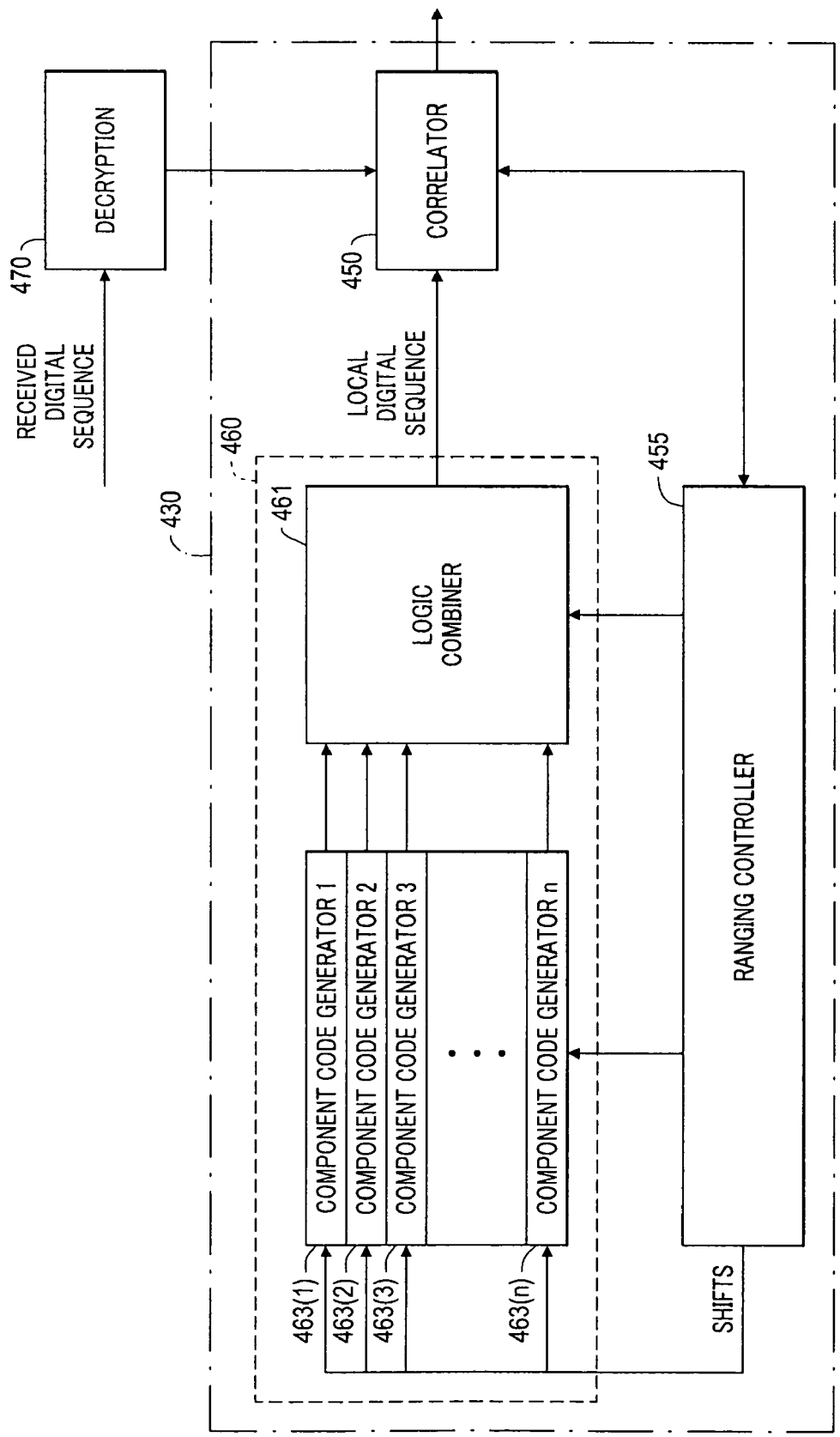
FIG. 4 shows a block diagram of a ranging determination module example according to an embodiment of the disclosure.

FIG. 4 shows a block diagram of a range acquisition module example 430 coupled with a decryption module 470 according to an embodiment of the disclosure. The range acquisition module 430 includes a shiftable ranging code generator 460, a correlator 450, and a ranging controller 455. Further, the shiftable ranging code generator 460 includes a plurality of shiftable component code generators 463(1-$n$), and a logic combiner 461. These elements are coupled together as shown in FIG. 4.

According to an embodiment of the disclosure, the shiftable component code generators 463(1-$n$) generate a group of component codes having co-prime cycle lengths. In addition, each shiftable component code generator 463 can be individually configured according to a shift configuration. In an example, a shiftable component code generator 463 generates a binary sequence "1110010" for a component code having a cycle length of seven according to a zero-shift configuration. When the shift configuration changes to a three-shift configuration, the shiftable component code generator 463 generates a binary sequence of "0010111".

In an embodiment, each shiftable component code generator 463 is configurable. For example, a shiftable component code generator 463 can generate a component code having a configurable cycle length. In an example, the shiftable component code generator 463 generates a component code having a prime cycle length, such as 11, 13, 17, and the like. In addition, a shiftable component code generator 463 can be configured to generate a component code that satisfies a code property. In an example, each shiftable component code generator 463 generates a pseudo-random-noise (PRN) code.

The logic combiner 461 is configured to combine the component codes, and generates a local digital sequence based on a logic operation. In an embodiment, the logic operation is configurable. The logic operation can be configured according to an identification of a received code, for example. For example, when the identification of the received code indicates that the received code is formed based on Eq. 1, the logic combiner 461 is then configured based on Eq. 1.

The correlator 450 calculates a correlation of the local digital sequence and a received digital sequence, for example, a received ranging code. In an example, the correlator 450 calculates the correlation for a pre-determined time duration.

In the FIG. 4 example, the received digital sequence is provided by the decryption module 470. For example, the received digital sequence is encrypted by a public key before transmission. The decryption module 470 decrypts the received digital sequence with a private key in association with the public key. The decrypted digital sequence is provided to the correlator 450 to calculate the correlation. It is noted that when the received digital sequence is not encrypted, the received digital sequence can be provided to the correlator 450 without decryption.

The ranging controller 455 provides various control signals to the shiftable component code generators 463 (1-$n$), the logic combiner 461 and the correlator 450. For example, the ranging controller 455 provides a high frequency clock signal to synchronize the shiftable component code generators 463 (1-$n$) to generate bits of the component codes in parallel. Further, the ranging controller 455 provides a reset signal to the shiftable component code generators 463(1-$n$) to periodically, such as weekly, restart the generation of the component codes. In addition, the ranging controller 455 provides shift signals to configure the shiftable component code generators 463(1-$n$) according to shift configurations.

In an embodiment, the shiftable component code generators 463(1-$n$) and the logic combiner 461 are configurable. The ranging controller 455 can send signals to configure the shiftable component code generators 463(1-$n$), and the logic combiner 461. In an example, a ranging apparatus having the range acquisition module 430 receives an identification signal identifying a ranging code. Based on the identification signal, the ranging apparatus determines component codes of the ranging code, and a combining logic for forming the ranging code. Then, the ranging controller 455 sends control signals to the shiftable component code generators 463(1-$n$) to configure the shiftable component code generators 463(1-$n$) to generate the determined component codes. In addition, the ranging controller 455 sends control signals to the logic combiner 461 to configure the logic combiner 461 to generate the local digital sequence based on the determined combining logic.

It is noted that the ranging controller 455 can also send signals to other modules. For example, the ranging controller 455 can send control signals to the correlator 450 to control a time duration for calculating correlation, for example. In another example, the ranging controller 455 can send signals to the decryption module 470 (not shown in FIG. 4) to change the private key in accordance to an identification signal.

Further, the ranging controller 455 can receive calculated correlations from the correlator 450, associate the correlations with shift configurations, determine modulo reminders for the component codes, and detect a ranging code shift of the ranging code based on the modulo reminders of the ranging code shift corresponding to the component codes.

Specifically, for example, the ranging controller 455 sends a shift signal to a shiftable component code generator 463 to configure the shiftable component code generator 463 to generate a component code based on a first modulo shift, such as 0 for a cycle length of seven. Then, the ranging controller 455 obtains a correlation from the correlator 450, and associates the correlation with the first modulo shift. Similarly, the ranging controller 455 sends shift signals to the shiftable component code generator 463 to configure the shiftable component code generator 463 to generate the component code based on other modulo shifts respectively, such as 1, 2, 3, 4, 5, 6 for the cycle length of seven. The ranging controller 455 respectively obtains correlations, and associates the correlations with the modulo shifts. Further, the ranging controller 455 determines a modulo shift, that has the largest correlation, as the modulo reminder of the ranging code shift corresponding the component code.

Similarly, the ranging controller 455 determines modulo reminders for other component codes. Then, based on the modulo reminders, the ranging controller 455 determines a ranging code shift of the ranging code. In an embodiment, when the cycle lengths of the component codes are co-prime, the modulo reminders can correspond to a ranging code shift based on a one-on-one mapping according to an assertion of Chinese reminder theorem. The ranging code shift can be determined by algorithms, such as extended Euclidean algorithm, and the like.

It is noted that the range acquisition module 430 can be implemented by software, hardware, or a combination of software and hardware. In an example, the range acquisition module 430 is implemented as firmware that can be executed by a processor to perform the ranging code generation. In another example, the range acquisition module 430 is implemented in a field programmable gate array (FPGA). In another example, the range acquisition module 430 is implemented as software instructions that can be stored on a computer readable storage medium. The software instructions can be executed by a processor to perform the ranging code generation. In another example, the range acquisition module 430 is implemented as an application specific integrated circuit (ASIC).

Figure 5:
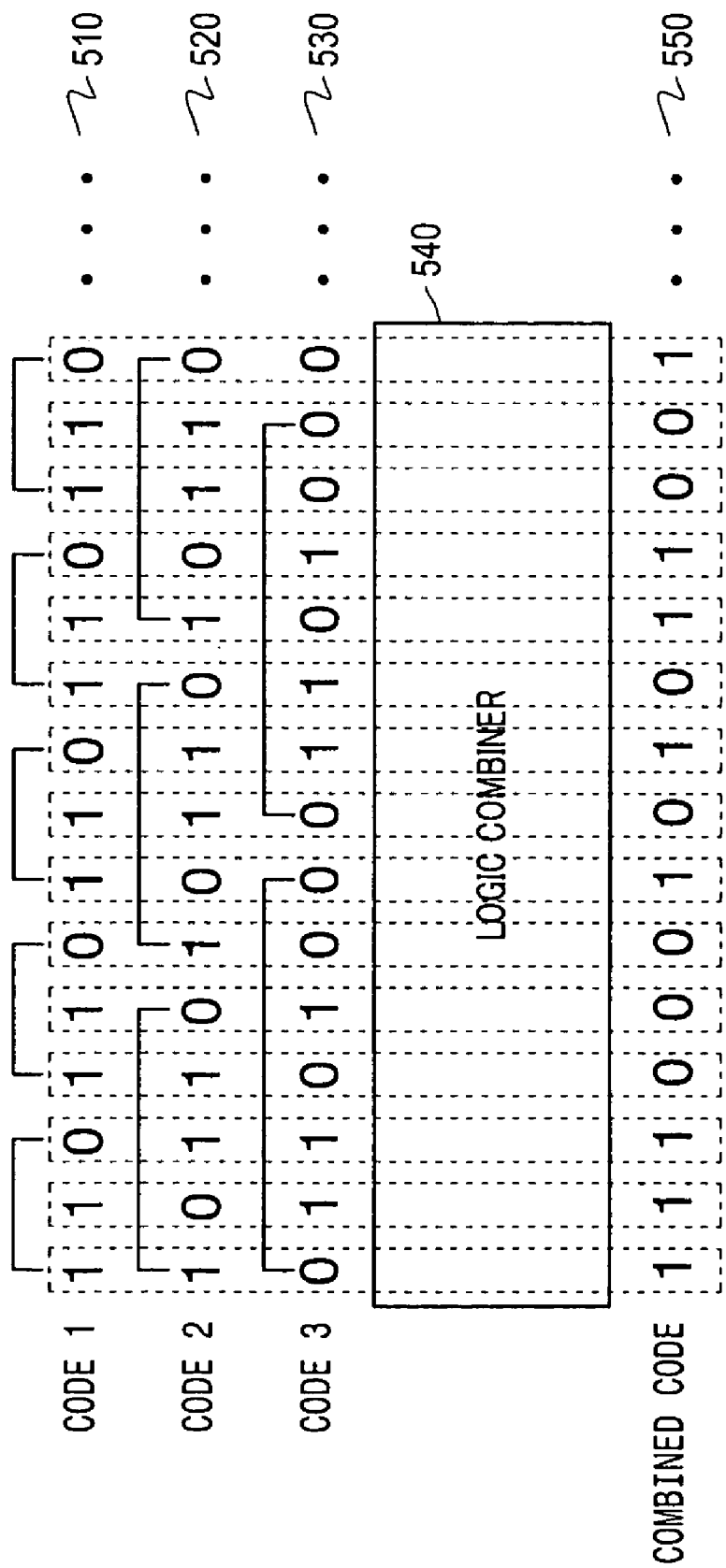
FIG. 5 shows an example that forms a ranging code based on co-prime component codes.

FIG. 5 shows an example for generating a combined ranging code 550 based on component codes 510-530 of co-prime cycle lengths. In the FIG. 5 example, the component code 510 has a cycle length of 3, the component code 520 has a cycle length of 5, and the component code 530 has a cycle length of 7. The combined ranging code 550 is calculated by a logic combiner 540. The logic combiner 540 calculates each bit of the combined ranging code 550 as a logic combination of corresponding bits of the component codes 510-530. Due to the reason that 3, 5, and 7 are co-prime numbers, the cycle length of the combined ranging code 550 is 105.

For ease and clarity, relatively small prime numbers are used in FIG. 5 for illustration. It is noted that any prime number can be used to generate the combined ranging code. It is also noted that non-prime numbers that are relative prime to each other can be used to generate the combined ranging code. In an embodiment, the component codes 510-530 are suitably selected to be pseudo-random-noise (PRN) codes.

Figure 6:
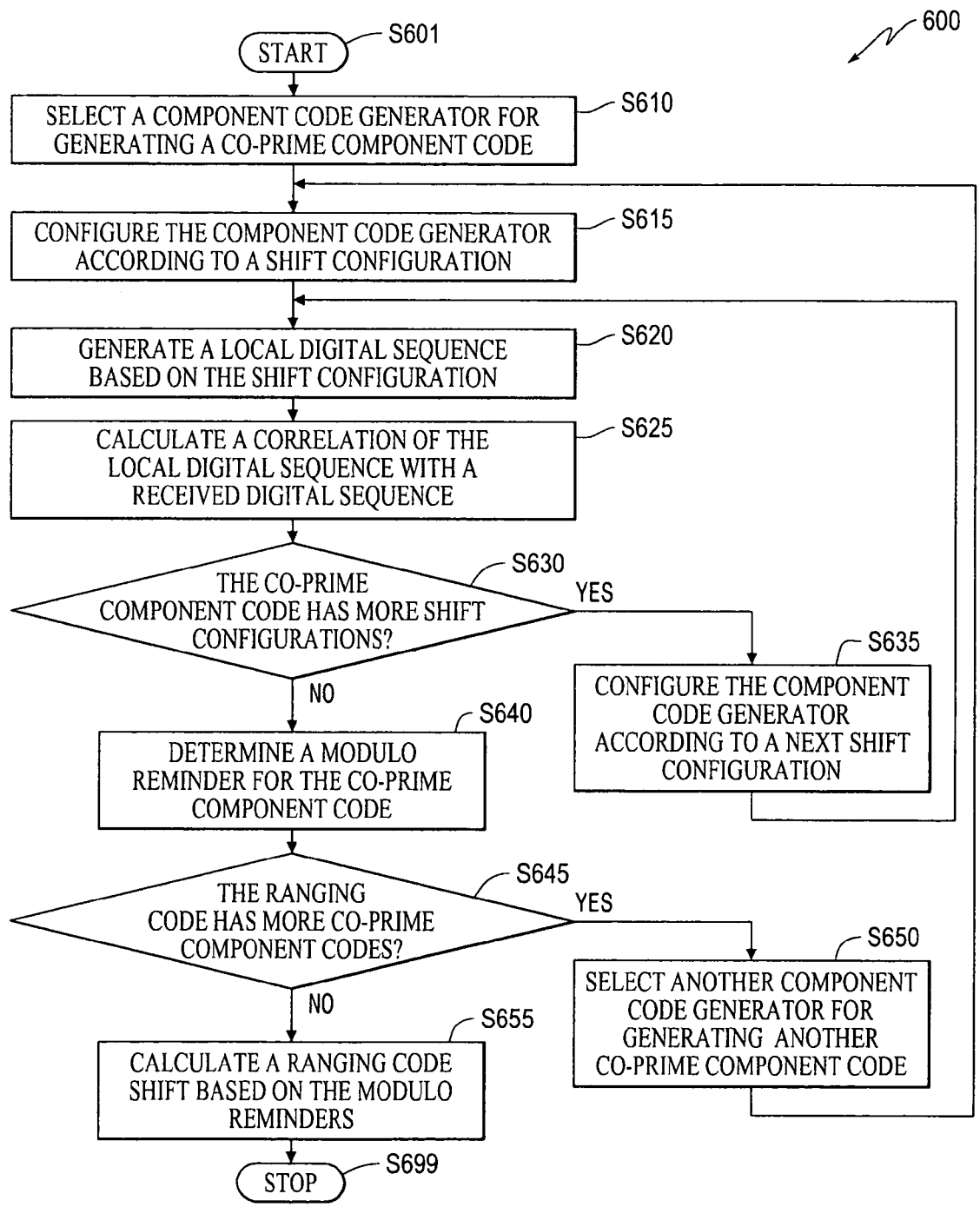
FIG. 6 shows a flow chart outlining a process example for a ranging determination module to determine a ranging code shift according to an embodiment of the disclosure.

FIG. 6 shows a flow chart outlining a process example 600 for the range acquisition module 430 to determine a ranging code shift of a received digital sequence according to an embodiment of the disclosure. The received digital sequence includes a ranging code that is formed based on a group of co-prime component codes. The range acquisition module 430 determines component shifts, such as modulo reminders of the ranging code shift. Based on the component shifts, the range acquisition module 430 determines the ranging code shift. The process starts from S601, and proceeds to S610.

At S610, the ranging controller 455 selects a shiftable component code generator for generating a co-prime component code to determine a module reminder of the ranging code shift corresponding to the co-prime component code. For example, the ranging controller 455 selects a shiftable component code generator 463, such as the shiftable component code generator 463(1), to determine the modulo reminder of the ranging code shift corresponding to a co-prime component code generated by the shiftable component code generator 463 (1).

At S615, the ranging controller 455 configures the shiftable component code generator 463(1) according to a shift configuration, such as a first shift configuration, and the like. For example, the ranging controller 455 sends a shift signal corresponding to the first shift configuration to the shiftable component code generator 463(1). In an embodiment, shift configurations correspond to modulo shifts for a cycle length of the co-prime component code. For example, the shift configurations correspond to 0, 1, 2, 3, 4, 5 and 6 shifts for a co-prime component code having a cycle length of seven. It is noted that the ranging controller 455 also configures other shiftable component code generators 463(2-n).

At S620, the shiftable ranging code generator 460 generates a local digital sequence based on the shift configuration. In FIG. 4 example, the shiftable component code generators 463 (1-n) generate component codes based on the shift configuration. Further, the logic combiner 461 combines the component codes to generate the local digital sequence.

At S625, the correlator 450 calculates a correlation between the generated local digital sequence and the received digital sequence. In the FIG. 4 example, the correlator 450 calculates a correlation between the local digital sequence and a received digital sequence for a time duration. The ranging controller 455 obtains the calculated correlation, and associates the correlation with the shift configuration.

At S630, the ranging controller 455 determines whether the co-prime component code has more shift configurations. When the co-prime component code has more shift configurations, the process proceeds to S635; otherwise, the process proceeds to S640.

At S635, the ranging controller 455 configures the shiftable component code generator 463 according to a next shift configuration. Then, the process returns to S620.

At S640, the ranging controller 455 determines the modulo reminder of the ranging code shift corresponding to the co-prime component code based on the correlations in association with the shift configurations. In an example, the ranging controller 455 selects a modulo shift having the largest correlation as the modulo reminder of the ranging code shift corresponding to the co-prime component code.

At S645, the ranging controller 455 determines whether there are more co-prime component codes for the ranging code. When there are more co-prime component codes, the process proceeds to S650; otherwise, the process proceeds to S655.

At S650, the ranging controller 455 selects another component code generator for generating another co-prime component code. Then, the process returns to S615.

At S655, the ranging controller 455 calculates a ranging code shift of the ranging code based on the modulo reminders of the ranging code shift corresponding to the co-prime component codes. In an embodiment, the modulo reminders correspond to the ranging code shift based on a one-on-one mapping according to an assertion of Chinese reminder theorem. The ranging code shift can be determined by algorithms, such as extended Euclidean algorithm, and the like. The process then proceeds to S699 and terminates.

It is noted that the process 600 can be suitably modified. In an example, verification steps to verify the determined modulo reminders can be added before S655, for example.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for ranging, comprising:
   receiving by a ranging apparatus a first ranging signal transmitted from a first remote apparatus, the first ranging signal including a first digital sequence that is a logic combination of a first group of co-prime component codes having co-prime cycle lengths;
   detecting first component shifts of the first digital sequence corresponding to the first group of co-prime component codes; and
   determining by the ranging apparatus a first ranging code shift of the first digital sequence based on the first component shifts.

2. The method of claim 1, further comprising:
   transmitting by the ranging apparatus an initial ranging signal including the first digital sequence, the initial ranging signal being received by the first remote apparatus that transmits the first ranging signal in response to receiving the initial ranging signal.

3. The method of claim 2, further comprising:
   determining by the ranging apparatus a distance between the ranging apparatus and the first remote apparatus based on the first ranging code shift and a transmission rate of the first digital sequence.

4. The method of claim 1, further comprising:
   receiving by the ranging apparatus at least a second ranging signal transmitted from a second remote apparatus, the second ranging signal including a second digital sequence that is a logic combination of a second group of co-prime component codes having co-prime cycle lengths;
   detecting second component shifts of the second digital sequence corresponding to the second group of co-prime component codes; and
   determining a relative ranging code shift between the first digital sequence and the second digital sequence based on the first component shifts and the second component shifts.

5. The method of claim 4, wherein determining the relative ranging code shift between the first digital sequence and the second digital sequence based on the first component shifts and the second component shifts further comprises:
   determining the first ranging code shift of the first digital sequence based on the first component shifts;
   determining a second ranging code shift of the second digital sequence based on the second component shifts; and determining the relative ranging code shift based on the first ranging code shift and the second ranging code shift.

6. The method of claim 4, wherein determining the relative ranging code shift between the first digital sequence and the second digital sequence based on the first component shifts and the second component shifts further comprises:
determining relative component shifts between the first component shifts and the second component shifts when the first group of co-prime component codes and the second group of co-prime component codes are the same; and
determining the relative ranging code shift between the first digital sequence and the second digital sequence based on the relative component shifts.

7. The method of claim 4, further comprising:
determining a position of the ranging apparatus based on at least the relative ranging code shift.

8. The method of claim 1, wherein detecting the first component shifts of the first digital sequence corresponding to the first group of co-prime component codes further comprises:
configuring a group of component code generators based on a shift configuration to generate the first group of co-prime component codes in association with the shift configuration;
combining the first group of co-prime component codes to generate a local digital sequence in association with the shift configuration; and
calculating a correlation of the first digital sequence and the local digital sequence.

9. The method of claim 8, further comprising:
respectively configuring a first component code generator for generating a first co-prime component code of the first group of the co-prime component codes based on 0 to n−1 modulo shifts when the first co-prime component code has a cycle length of n;
respectively calculating correlations in association with the modulo shifts; and
determining one of the modulo shifts having a largest correlation as one of the first component shifts of the first digital sequence corresponding to the first co-prime component code.

10. The method of claim 1, further comprising:
decrypting the first digital sequence from an encrypted sequence extracted from the first ranging signal.

11. A ranging apparatus for use with one or more remote apparatuses, the ranging apparatus comprising:
a receiver configured to receive a first ranging signal transmitted from a first remote apparatus, the first ranging signal including a first digital sequence that is a logic combination of a first group of co-prime component codes having co-prime cycle lengths; and
a range acquisition module configured to detect first component shifts of the first digital sequence corresponding to the first group of co-prime component codes, and to determine a first ranging code shift of the first digital sequence based on the first component shifts.

12. The ranging apparatus of claim 11, further comprising:
a ranging code generator configured to generate the first digital sequence; and
a transmitter module configured to transmit an initial ranging signal including the first digital sequence, the initial ranging signal being received by the first remote apparatus that transmits the first ranging signal in response to receiving the initial ranging signal.

13. The ranging apparatus of claim 12, wherein the ranging code generator further comprises:
a plurality of component code generators configured to generate the first group of co-prime component codes; and
a logic combiner configured to combine the first group of co-prime component codes to generate the first digital sequence.

14. The ranging apparatus of claim 12, further comprising:
an encryption module configured to encrypt the first digital sequence before transmission.

15. The ranging apparatus of claim 12, wherein the range acquisition module is configured to determine a distance between the apparatus and the first remote apparatus based on the first ranging code shift and a transmission rate of the first digital sequence.

16. The ranging apparatus of claim 11, wherein:
the receiver is configured to receive a second ranging signal transmitted from a second remote apparatus, the second ranging signal including a second digital sequence that is a logic combination of a second group of co-prime component codes; and
the range acquisition module is configured to
detect second component shifts of the second digital sequence corresponding to the second group of co-prime component codes; and
determine a relative ranging code shift between the first digital sequence and the second digital sequence based on the first component shifts and the second component shifts.

17. The ranging apparatus of claim 16, wherein
the range acquisition module is configured to determine a position of the apparatus based on at least the relative ranging code shift.

18. The ranging apparatus of claim 16, wherein
the range acquisition module is configured to
detect relative component shifts between the first component shifts and the second component shifts when the first group of co-prime component codes and the second group of co-prime component codes are the same; and
determine the relative ranging code shift based on the relative component shifts.

19. The ranging apparatus of claim 11, wherein the range acquisition module further comprises:
a plurality of shiftable component code generators configured to generate the first co-prime component codes based on a shift configuration;
a logic combiner configured to combine the generated first co-prime component codes into a local digital sequence; and
a correlator configured to calculate a correlation between the local digital sequence and the received first digital sequence, the correlation being in association with the shift configuration.

20. The ranging apparatus of claim 19, wherein the range acquisition module further comprises:
a ranging controller configured to respectively configure a first shiftable component code generator for generating a first one of the first co-prime component codes based on 0 to n−1 modulo shifts when the first co-prime component code has a cycle length of n, receive correlations in association with the modulo shifts, and determine one of the modulo shifts having a largest correlation as a component shift of the first digital sequence corresponding to the first co-prime component code.

21. The ranging apparatus of claim 11, further comprising:
a decryption module configured to decrypt the first digital sequence from an encrypted sequence extracted from the first ranging signal.

* * * * *